(12) United States Patent
Lee et al.

(10) Patent No.: US 7,887,976 B2
(45) Date of Patent: Feb. 15, 2011

(54) PASTE FOR SOLID OXIDE FUEL CELLS, ANODE-SUPPORTED SOLID OXIDE FUEL CELLS USING THE SAME, AND FABRICATING METHOD THEREOF

(75) Inventors: Hae-Weon Lee, Seoul (KR); Jong-Ho Lee, Seoul (KR); Joo-Sun Kim, Gyeonggi-do (KR); Ji-Won Son, Seoul (KR); Hue-Sup Song, Seoul (KR); Hyoung-Chul Kim, Seoul (KR); Hwa-Young Jung, Incheon (KR)

(73) Assignee: Korea Institute of Science and Technology, Seoul (KR)

( * ) Notice: Subject to any disclaimer, the term of this patent is extended or adjusted under 35 U.S.C. 154(b) by 1050 days.

(21) Appl. No.: 11/529,212

(22) Filed: Sep. 29, 2006

(65) Prior Publication Data

US 2007/0077476 A1 Apr. 5, 2007

(30) Foreign Application Priority Data

Sep. 30, 2005 (KR) ...................... 10-2005-0092581

(51) Int. Cl.
*H01M 4/02* (2006.01)
*H01M 4/64* (2006.01)
*H01M 8/10* (2006.01)

(52) U.S. Cl. .................. 429/530; 429/523; 429/517; 429/479; 429/486

(58) Field of Classification Search ......... 429/479–497, 429/517–523, 530
See application file for complete search history.

(56) References Cited

U.S. PATENT DOCUMENTS

| | | | |
|---|---|---|---|
| 5,009,708 A | 4/1991 | Grünwald et al. | |
| 5,431,718 A | 7/1995 | Lombard et al. | |
| 5,968,673 A * | 10/1999 | Aizawa et al. | 429/30 |
| 6,420,064 B1 | 7/2002 | Ghosh et al. | |
| 6,645,660 B2 | 11/2003 | Datz et al. | |
| 2003/0175571 A1 * | 9/2003 | Kawano et al. | 429/34 |

(Continued)

FOREIGN PATENT DOCUMENTS

JP 04-012037 1/1992

(Continued)

OTHER PUBLICATIONS

European Search Report dated Dec. 12, 2006, directed at counterpart EP application No. 06255081.9.

(Continued)

*Primary Examiner*—Dah-Wei D Yuan
*Assistant Examiner*—Edu E Enin-Okut
(74) *Attorney, Agent, or Firm*—Fish & Richardson P.C.

(57) ABSTRACT

Disclosed is a paste for screen printing which is used in the fabrication of an anode functional layer, an electrolyte layer, or a cathode layer of an anode-supported solid oxide fuel cell. The paste contains a raw material powder, ethyl cellulose alpha terpineol, and an alcoholic solvent in which a thermosetting binder is soluble. Also provided is a method of fabricating an anode-supported solid oxide fuel cell using the paste. Thus, a reliable high-performance, large area solid oxide fuel cell that can be economically and efficiently fabricated is provided.

14 Claims, 3 Drawing Sheets

U.S. PATENT DOCUMENTS

2004/0166394 A1 * 8/2004 Sfeir et al. .................. 429/33
2004/0245910 A1 12/2004 Tang et al.

FOREIGN PATENT DOCUMENTS

| KR | 100215598 | | 5/1999 |
| KR | 215598 | B1 * | 8/1999 |
| WO | WO 02089242 | A1 * | 11/2002 |
| WO | WO 03/036739 | | 5/2003 |

OTHER PUBLICATIONS

Mai et al. (2005). "Ferrite-based perovskites as cathode materials for anode-supported solid oxide fuel cells: Part I. Variation of composition," *Solid State Ionics* 176:1341-1350.

English language translation of Korean Office Action dated Oct. 26, 2006 directed to a counterpart KR application No. 2005-0092581.

* cited by examiner

PASTE FOR SOLID OXIDE FUEL CELLS, ANODE-SUPPORTED SOLID OXIDE FUEL CELLS USING THE SAME, AND FABRICATING METHOD THEREOF

BACKGROUND OF THE INVENTION

1. Field of the Invention

The present invention relates to a solid oxide fuel cell and a fabricating method thereof, and more particularly, to a large area planar type high performance solid oxide anode-supported unit cell which can substantially reduce structural defects and interfacial defects.

2. Description of the Background Art

A fuel cell is a generator using electrochemical reaction of an oxidizer and a fuel. The fuel cell does not undergo a process of converting chemical energy of the fuel into thermo-mechanical energy, thereby improving power generation efficiency and environment preservation.

The fuel cells are classified into a Phosphoric Acid Fuel Cell (PAFC), a Polymer Electrolyte Membrane Fuel Cell (PEMFC), a Molten Carbonate Fuel Cell (MCFC) and a Solid Oxide Fuel Cell (SOFC) according to used electrolytes. The PEMFC has an operation range of about 80° C., the PAFC has an operation range of about 200° C., the MCFC has an operation range of about 650° C., and the SOFC has an operation range of about 800° C. The solid oxide fuel cell whose constituents are all made of solid phases such as ceramic and meal has the highest efficiency. In addition, the solid oxide fuel cell is advantageous in selection of various fuels and use of waste heat. Accordingly, the solid oxide fuel cell can be applied for cogeneration with gas turbine as well as household fuel cell.

The solid oxide fuel cell commonly employs $ZrO_2$ as an electrolyte. Recently, yttria stabilized zirconia (YSZ) doped with $Y_2O_3$ has been mostly used. Various kinds of solid oxide fuel cells have been developed according to a unit cell configuration, a stack and an operating temperature. The unit cells are classified into an electrolyte-supported unit cell and an electrode-supported unit cell according to structural supports. The electrode-supported unit cells are classified into a cathode-supported unit cell and an anode-supported unit cell.

The anode-supported unit cell is fabricated by sequentially forming an anode functional layer, an electrolyte layer and a cathode layer on an anode support substrate. In fabrication of the anode-supported unit cell, surface defects of a porous anode support generate defects of an electrolyte. It is thus very important to appropriately control the pore structure of the anode support and to prevent large surface defects thereof.

In the porous anode prepared by using solid particles or polymer particles as a pore forming agent, resulting anode support substrate has bi-modal or tri-modal pore size distribution. When graphite is used as the pore forming agent, the shape of the pores has anisotropy, which increases process defects on the electrolyte layer. Coarse pores formed by multiplicity of the pore diameter distribution or anisotropy of the pore shape generate depressions or cracks on the electrolyte layer succeedingly formed on the anode by screen printing, thereby reducing the production yield and performance of the unit cell.

Another process defects generated in fabrication of the large area unit cell are delamination or cracks generated between the component layers. Such interfacial defects increase resistance of the unit cell, sharply deteriorate the performance of the unit cell, and decrease damage resistance to a thermal stress. The interfacial defects are generated due to differences in sintering shrinkage or thermal expansion coefficient between the component layers. When the interface strength is weak, the interfacial defects usually increases in size, which reduces the production yield and deteriorates performance of the unit cell in operation. When the thermal stress is generated, the lifespan of the unit cell is seriously shortened. The interfacial defects of the unit cell of the solid oxide fuel cell mostly result from structural defects on the surface of the anode, powder packing non-uniformity of the anode functional layer and/or the electrolyte layer which is formed in thick film by successive screen printing, and low interface adhesion strength to the electrolyte layer of the cathode layer having a functionally graded structure (gradient-given structure in microstructure or property, for example, porosity of the electrode layer is reduced from the outside to the inside).

Especially, when a thermosetting binder is used to fabricate the anode support to obtain a uniform porous structure, segregations and coarse pores of the thermosetting binder worsen wettability of a paste for forming a thick film or generate depressions on a printed thick film during the process of forming the anode functional layer or the electrolyte layer by screen printing. Such defects may result in defects of the anode functional layer or the electrolyte layer and the associated interfaces. The problems occurring in the process of forming the thick film by screen printing make it more difficult to fabricate a high performance unit cell having a very thin electrolyte.

SUMMARY OF THE INVENTION

Therefore, an object of the present invention is to maximize a thermo-mechanical property and an electrochemical property of a unit cell by reducing structural defects of each layer of a solid oxide fuel cell and interfacial defects between the layers during a fabricating process.

Another object of the present invention is to reduce defect generation dependency of a screen-printed thick film on surface defects of an anode support which is a support substrate of a unit cell in an anode-supported solid oxide fuel cell.

Yet another object of the present invention is to provide a fabricating method of an anode-supported solid oxide fuel cell which can decrease defects of component layers and resulting interfaces.

To achieve these and other advantages and in accordance with the purpose of the present invention, as embodied and broadly described herein, there is provided a paste for forming a thick film by screen printing whose defect generation has little or no dependence on surface defects of an anode support. There is also provided a fabricating method of an anode-supported solid oxide fuel cell using the paste which reduces defects of layers and defects of interfaces between the layers. In accordance with the present invention, a high performance high output solid oxide fuel cell having a thin electrolyte layer can be economically fabricated, and durability and reliability of a unit cell can be remarkably improved.

The core of the present invention is to reduce defects generated in the interfaces of the component layers forming the unit cell in order to produce the thin and dense electrolyte layer.

In general, generation of defects of the electrolyte layer is highly affected by the surface defects of an anode support. In addition, thermal stresses are locally developed due to a chemical composition difference of the anode support by non-uniform mixing of anode raw material powder (for example, NiO-YSZ), thereby generating cracks on the electrolyte layer or destroying the unit cell itself.

The anode support includes a thermosetting binder such as phenolic resin to control a porous structure to have high gas permeability. Therefore, a general paste for screen printing has low wettability to the surface of the anode.

In accordance with the present invention, an alcoholic solvent having excellent solubility to the thermosetting binder is added to alpha terpineol which is a general solvent in order to dissolve the thermosetting binder present on the surface of the anode. As a result, wettability of the paste can be improved and screen mesh patterns can be leveled. As described above, when the thick film is formed by screen printing with controlled composition of the paste for thick film, it is insensitive to surface defects of the anode support and has an excellent interfacial adhesion property, thereby reducing generation of defects between the electrode and the electrolyte in fabrication of the unit cell and improving the production yield of the unit cell. Furthermore, performance degradation of the unit cell can be prevented and long time stability of the unit cell can be attained by preventing deterioration of the interfacial structure and growth of defects which may occur during the cell operation.

In detail, there is provided a paste for screen printing for forming an anode functional layer, an electrolyte layer and a cathode layer for fabrication of an anode-supported solid oxide fuel cell, the paste for the solid oxide fuel cell, including raw material powder of each layer, ethyl cellulose which is a binder, alpha terpineol which is a solvent, and an alcoholic solvent which has solubility to a thermosetting binder contained in an anode support and which is added by 0.5 to 20 wt % of alpha terpineol as an additional solvent. The paste can further include a thermosetting binder by 5 to 40 wt % of ethyl cellulose.

There is also provided a fabricating method of a solid oxide fuel cell using the paste, including the steps of: forming a planar type anode support with granules containing raw material powder and a thermosetting binder; preparing a paste for screen printing of component layers on the anode support, the paste containing an alcoholic solvent having solubility to the thermosetting binder; sequentially forming an anode functional layer and an electrolyte layer on the anode support by screen printing using the paste of this invention; co-firing the structure of the anode support/anode functional layer/electrolyte layer; and forming a cathode layer on the electrolyte layer by screen printing.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
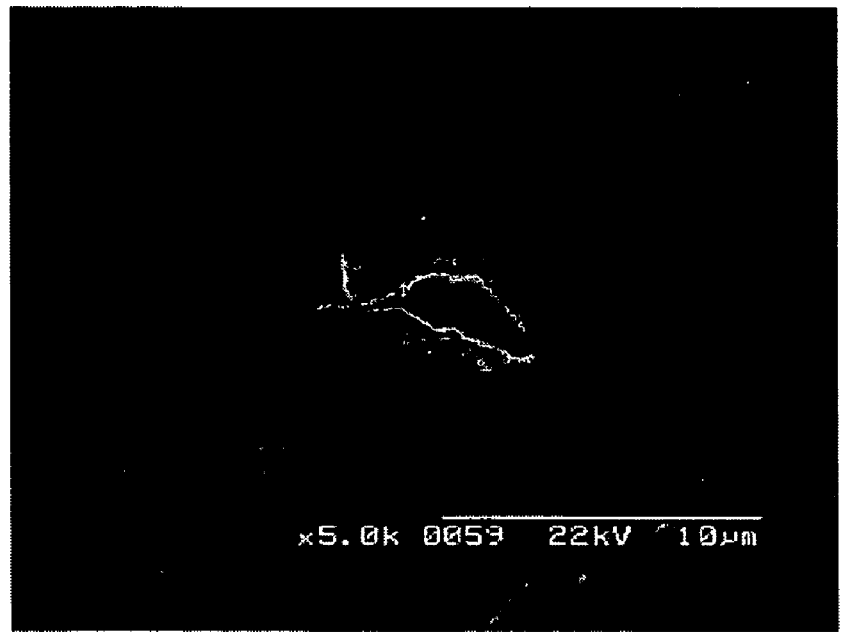
FIG. 1 is a photograph showing a pinhole formed on an electrolyte layer due to poor wettability of a paste.

Reference will now be made in detail to the preferred embodiments of the present invention, examples of which are illustrated in the accompanying drawings.

The characteristics of the present invention and the characteristics of each step of fabrication will now be explained in detail by the following examples.

Fabrication of Anode Support

The characteristics required in an anode include electric conductivity, a thermal expansion coefficient, triple phase boundary length relating to electrochemical activity, and permeability of fuel gas. The electric conductivity and the thermal expansion coefficient are determined by the composition of raw materials of the anode, but the triple phase boundary length and the gas permeability are closely associated with its pore structure.

It is efficient to use a thermosetting binder to obtain a preferable pore structure for the anode. However, defects easily occur on a thick film formed on the anode due to segregations and coarse pores left behind of the thermosetting binder generated in a thermosetting molding process of forming the anode. It is thus necessary to reduce generation of the defects.

For this, a non-aqueous (alcoholic or acetonic) slurry containing anode raw material powder and a binder (thermosetting resin and thermoplastic resin) is sprayed into a nonsolvent having little solubility or partial solubility to the binder, partially cured, and dried at a temperature below 70° C., thereby preparing granules having uniform distribution of the powder and binder. The granules have an almost spherical shape and maintain a size of 50 to 100 μm to minimize non-uniform powder packing of a anode support substrate in the compression molding process. In this example, NiO and $ZrO_2$ doped with $Y_2O_3$ are used as the anode raw material. As the binder, at least one of phenolic resin, polyester and polyamide is selected as the thermosetting resin, and at least one of polyvinyl butyral, polyvinyl alcohol, polyvinyl pyrrolidone and acrylic resin is selected as the thermoplastic resin.

The granules are dried at a temperature below 70° C. and compression-molded at a temperature of 90 to 120° C. under a pressure of 5 to 150 MPa, thereby obtaining about 300 to 1000 μm thick anode support substrate.

Preparation of Paste for Thick Film for Screen Printing

When a thick film is formed by screen printing on the surface of the anode support containing the thermosetting binder, the following problems may occur. First, the commonly used paste has poor wettability to the surface of the anode. Second, defects such as depressions and cracks are easily generated on the succeeding thick film due to surface defects of the anode having a relatively coarse pore structure. Third, the microstructures (for example, powder packing structure and binder distribution) of the existing thick film are influenced by a solvent penetration from a succeeding thick film in a process of consecutively forming a thick film. Such influences on the microstructures result in debinding defects and sintering defects.

Figure 2:
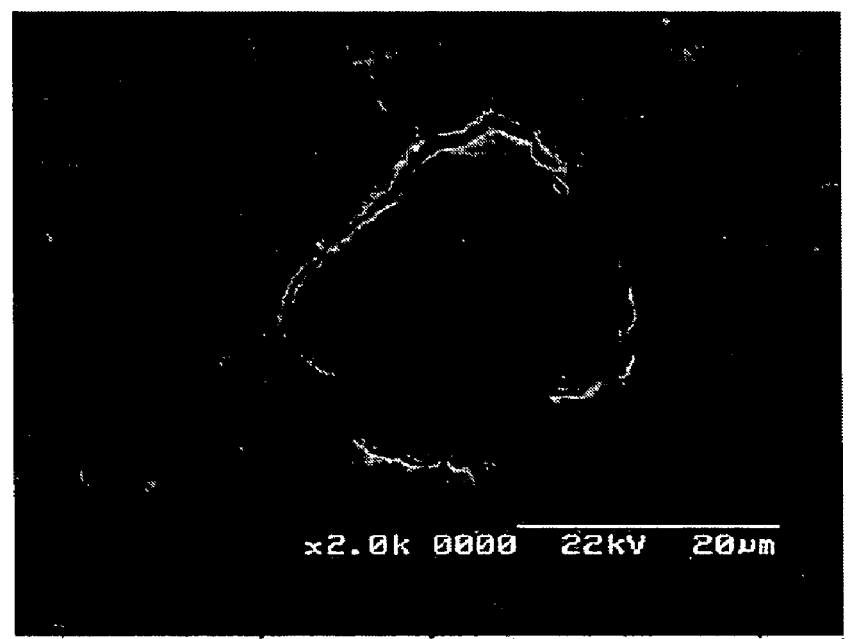
FIG. 2 is a photograph showing an electrolyte layer locally depressed due to coarse pores.

When segregations of the thermosetting binder exist on the surface of the anode support, if the paste for forming the thick film by screen printing has poor wettability, as shown in FIG. 1, pinhole type coarse pores are formed on the thick film. In addition, as illustrated in FIG. 2, depressions, shrinkages and cracks may be easily generated on the electrolyte thick film due to coarse pores existing on the anode support fabricated by thermosetting molding.

The present invention provides the composition of the paste which possesses better wettability to the thermosetting binder system included in the anode, reduces dependency on surface defects of the anode, and improves a leveling property in screen printing. In the case of the anode functional layer, the paste contains 53 to 63 wt % of raw material powder, 1.0 to 5.4 wt % of ethyl cellulose which is a binder, and 30 to 40 wt % of alpha terpineol. In the case of the electrolyte layer, the paste contains 40 to 60 wt % of raw material powder, 0.7 to 9.3 wt % of ethyl cellulose, and 32 to 40 wt % of alpha terpineol. Especially, in the case of the anode functional layer or the electrolyte layer, the paste further contains an alcoholic solvent (for example, butanol, isopropyl alcohol, ethanol, methanol, etc.) by 0.5 to 20 wt % of alpha terpineol in addition to the raw material powder, ethyl cellulose which is a binder, and alpha terpineol which is a general solvent.

Wettability of the paste is improved even in the segregation region of the thermosetting binder due to solubility of the alcoholic solvent to the thermosetting binder, thereby reducing formation of pinholes on the thick film. Additionally, when wettability of the paste is improved, a leveling speed of removing mesh patterns formed by screen printing can be increased, and surface flatness of the whole thick film can also be improved The paste can further contain a small quantity of plasticizer.

In accordance with the present invention, the paste for the thick film for screen printing can be efficiently applied to fabrication of thick films of the cathode layer as well as fabrication of the anode functional layer and the electrolyte layer.

Thermal Curing Treatment for Preventing Depressions of Thick Films by Coarse Pores The thick films formed by screen printing must resist an external pressure applied in a forming process, namely, a squeegee pressure. In addition, in order to form a dense thick film even in the presence of coarse defects on the surface of the anode, a previously-formed thick film must be kept from being deformed due to solvent penetration from a succeedingly-formed thick film.

Accordingly, the present invention uses a thermosetting paste having resistance to the external pressure and solvent penetration in addition to the additional solvent additive for improving wettability. That is, besides addition of the alcoholic solvent, a paste containing a phenolic binder by 5 to 40 wt % of ethyl cellulose is prepared, and a drying and thermal curing treatment performed at 90 to 200° C. for 0.1 to 2 hours is added to the process of forming the thick film by screen printing, thereby improving resistance to the pressure and solvent penetration in the succeeding screen printing.

In accordance with the present invention, a multilayered structure thick film having a composite composition or structure can be easily fabricated by using the thermally curable paste. Here, the anode functional layer and the electrolyte layer are consecutively formed on the anode support by using the thermally curable paste.

The thermally curable paste and the curing treatment can be efficiently applied to fabrication of thick films of the cathode layer as well as fabrication of the anode functional layer and the electrolyte layer.

Formation of Multilayered Structure by Consecutive Screen Printing

The most serious defects generated in the process of forming the multilayered structure thick films are damages of the existing thick film by the squeegee pressure applied in screen printing, and interlayer delamination and non-uniform powder packing by dissolution of the binder by the solvent penetration. The transport of the solvent caused by the solvent penetration and the drying process is always accompanied by the redistribution of the binder and the rearrangement of the powder particles.

In accordance with the present invention, the multilayered thick films are consecutively formed by screen printing by using the thermally curable paste, and thus the segregation of the thick film elements is restricted. As a result, the multilayered thick films are fabricated without defects.

Figure 3:
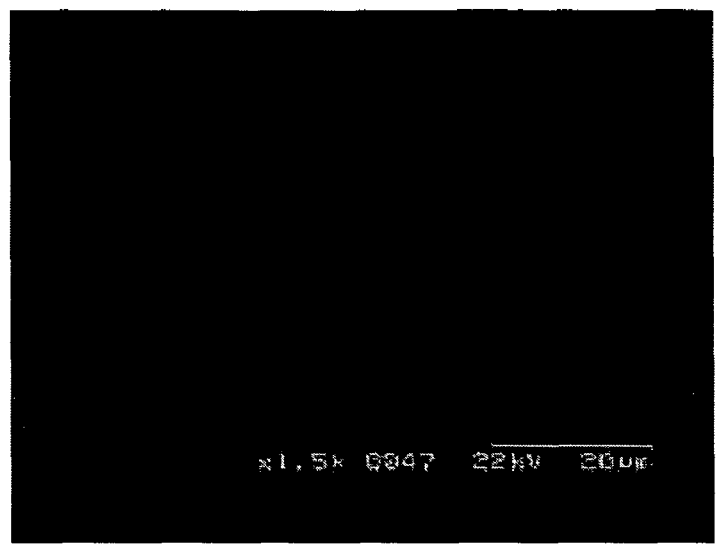
FIG. 3 is a photograph showing an electrolyte layer having a dense surface structure without defects in accordance with the present invention.

The composition of the paste for the thick film for forming the functional layer or the electrolyte layer is controlled to make the thick films insensitive to surface defects of the anode support. Therefore, the process of forming the thick film can be carried out without generating defects in screen printing. FIG. 3 shows a photograph of the surface of the electrolyte thick film formed without defects by improving the process.

Co-Firing of Anode Support/Anode Functional Layer/Electrolyte Layer

In order to thermally treat the multilayered anode-electrolyte-cathode structure without defects, differences in sintering shrinkage and thermal expansion coefficient of each layer material must be overcome. In the current elements of the unit cell, a sintering temperature range of a perovskite type cathode material is very different from that of an anode support material (for example, NiO/YSZ cermet) and an electrolyte material (for example, YSZ). In accordance with the present invention, the anode support and the electrolyte are fired at the same time, and then the cathode is sintered.

The most serious problem occurring in co-firing of the anode and the electrolyte is that the anode support (for example, NiO/YSZ cermet) and the electrolyte (for example, YSZ) have very different sintering shrinkage. Since the anode support and the electrolyte are different in sintering temperature and shrinkage rate, warpage can be generated. When warpage occurs in the sintering process, defects are easily generated on the interface between the anode and the electrolyte. Accordingly, in order to fire the anode and the electrolyte at the same time, the sintering speeds must be equalized as much as possible by changing the sintering conditions such as a heating rate and a hold time.

In accordance with the present invention, for efficient co-firing, the thermal treatment is performed by maintaining the heating rate below 1° C. per minute in the temperature range of removal of the organic binder contained in the anode support, sharply increasing the heating rate to 2 to 5° C. per minute before sintering of the electrolyte, and decreasing the heating rate to 2° C. per minute.

Formation and Sintering of Cathode

A succeeding step for forming a multilayered cathode layer is performed after sintering the anode support/anode functional layer/electrolyte layer.

In the case of a cathode functional layer, a paste for a multilayered cathode thick film contains 48 to 60 wt % of raw material powder, 3.0 to 3.5 wt % of ethyl cellulose which is a binder, and 32 to 50 wt % of alpha terpineol. In the case of a cathode layer, the paste contains 45 to 55 wt % of raw material powder, 1.1 to 2.5 wt % of ethyl cellulose, and 32 to 50 wt % of alpha terpineol. In the case of a current collecting layer, the paste contains 45 to 55 wt % of raw material powder, 1.1 to 4.9 wt % of ethyl cellulose, and 35 to 48 wt % of alpha terpineol.

The techniques applied to prepare the thick film pastes for the anode functional layer or the electrolyte layer can be applied in the same manner. The paste can further contain an alcoholic solvent (for example, butanol, isopropyl alcohol, ethanol, methanol, etc.) by 0.5 to 20 wt % of alpha terpineol contained in the general paste. Additionally, the paste contains a phenolic binder by 5 to 40 wt % of ethyl cellulose, for improving wettability between coating layers and mechanical strength in formation of the multilayered structure thick film.

In the multilayered cathode formation, in order to obtain three-dimensional distribution of a three phase interface, namely, an interface of gas phase/electrolyte/cathode, the cathode functional layer is formed on the electrolyte layer by using a composite composed of La—Sr—Mn (LSM) oxide having electronic conductivity and YSZ having ionic conductivity.

In addition, so as to efficiently perform current collection in the cathode, the current collecting layer is formed by using La—Sr—Co (LSC) oxide having high electronic conductivity. The LSC having chemical reactivity to the YSZ of the cathode layer generates $La_2Zr_2O_7$ or $SrZrO_3$ having low conductivity. Therefore, the LSM is inserted between the cathode functional layer and the current collecting layer as a buffering cathode layer.

The tri-layer composite cathode layer of LSM-YSZ/LSM/LSC is formed on the multilayered structure in which the YSZ film has been coated on the anode support as the electrolyte layer, and thermally treated at a temperature of 1100 to 1300° C.

Large Area Anode-Supported Flat Type Unit Cell

In general, the anode support used in fabrication of the unit cell has a thickness variation. When the area of the unit cell increases, the thickness variation also increases. The thickness variation of the anode support causes a squeegee pressure difference in screen printing, thereby changing the internal structure of the anode support. Interlayer delamination or cracks are easily generated due to the migration of the binder or the local rearrangement of the powder particles occurring in the solvent penetration and removing (drying) process.

One of the advantages of the anode support fabricated by compression molding or tape casting using the thermosetting binder is that there is little possibility of changing the structure of the anode in spite of the thickness variation of the anode.

The large area unit cell can maximize the advantages of the anode fabricated by using the thermosetting binder. In accordance with the present invention, the large area unit cell is economically fabricated with reproducibility by using the process of forming the multilayered structure thick film.

Figure 4:
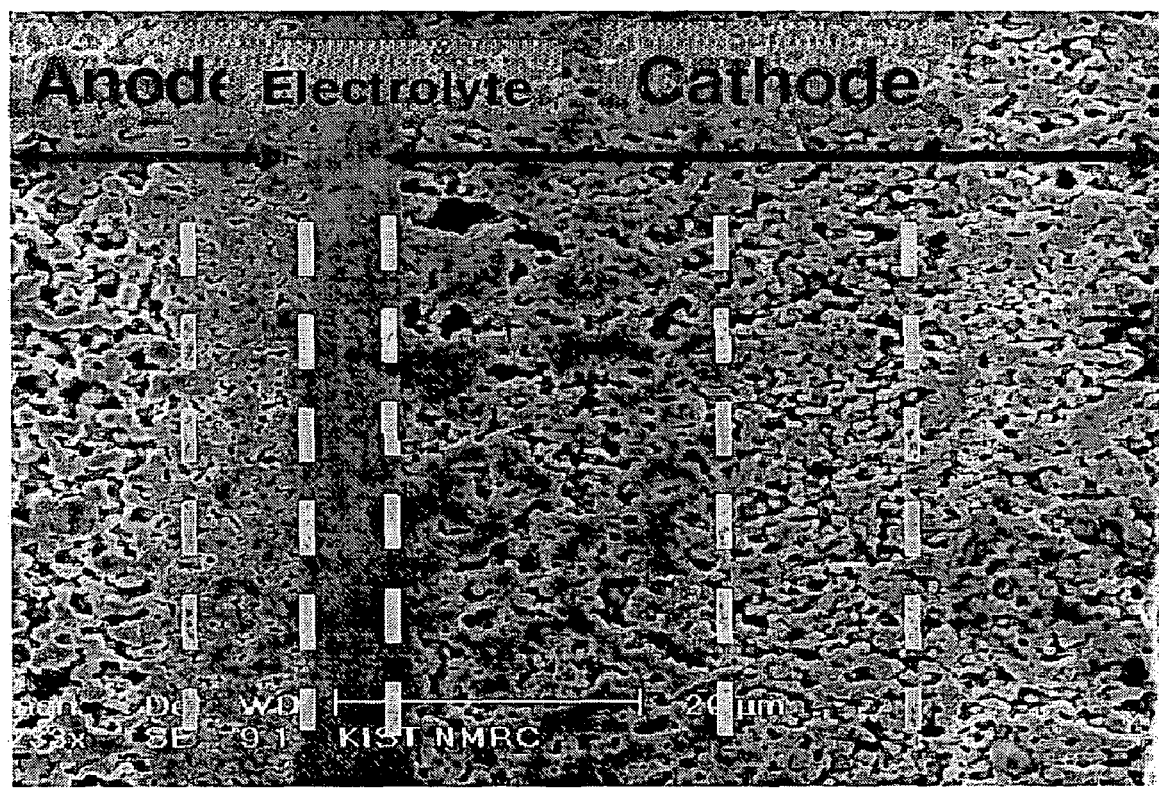
FIG. 4 is a photograph showing a section of a unit cell of an anode-supported solid oxide fuel cell in accordance with the present invention.

The unit cell includes 0.3 to 1 mm of porous anode support, 5 to 50 μm of anode functional layer, 5 to 20 μm of electrolyte layer, and 30 to 80 μm of composite cathode layer. The composite cathode layer includes a cathode functional layer, a cathode and a current collecting layer. FIG. 4 shows a cross-sectional structure of a real unit cell.

Figure 5:
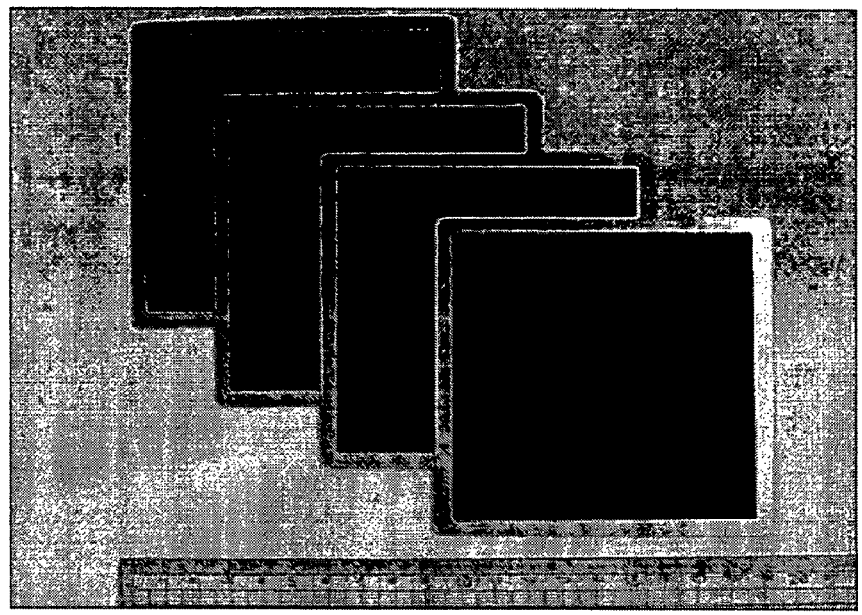
FIG. 5 is a photograph showing unit cells fabricated at a size of 10 cm×10 cm.
Figure 6:
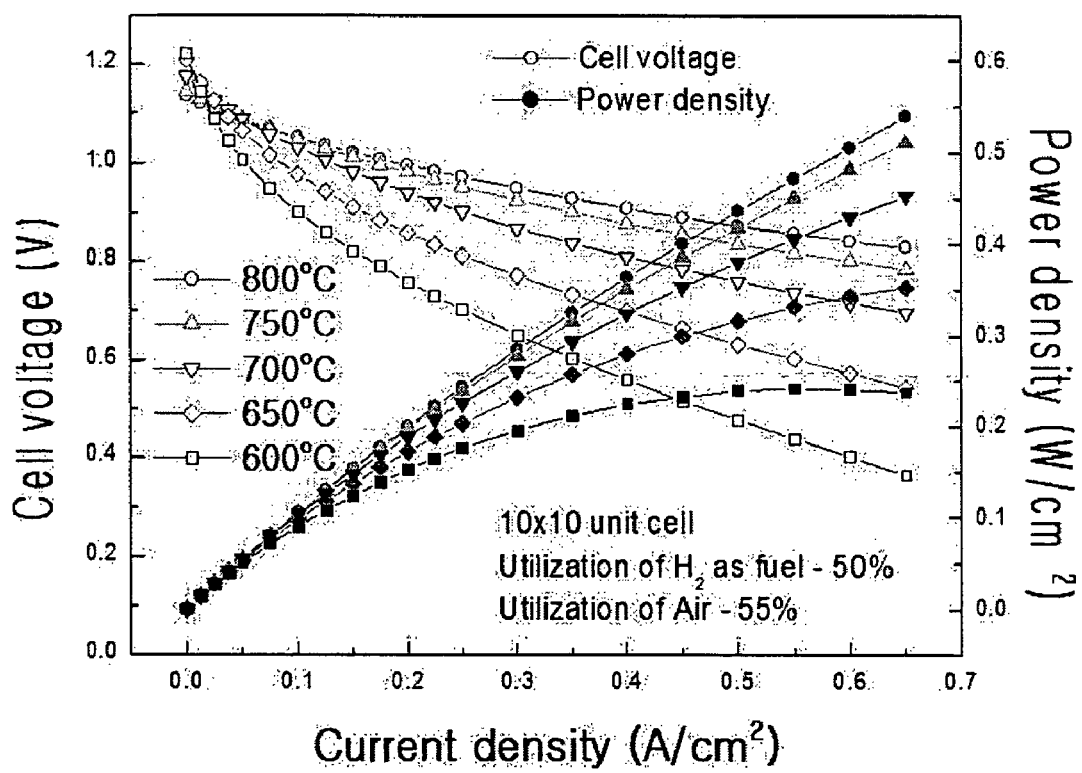
FIG. 6 is a graph showing characteristics of the fabricated unit cell.

FIG. 5 is a photograph showing the unit cells fabricated at a size of 10 cm×10 cm. In accordance with the present invention, the maximum size of the unit cell is 20 cm×20 cm. FIG. 6 is a graph showing output characteristics of the fabricated unit cell, namely, a cell voltage and a power density with regard to a current density and a temperature.

As discussed earlier, in accordance with the present invention, the high performance large area solid oxide fuel cell can be fabricated by using the high efficiency porous structure anode formed by compression molding. Especially, the composition of the paste for screen printing is controlled to improve wettability, and the transport of the individual element is restricted by curing. It is thus possible to restrict surface defects of the layers and interfacial defects between the layers in fabrication and improve the interface strength. As a result, the electrode having the functionally graded structure can be most economically and efficiently fabricated, thereby reducing the production cost of the large area unit cell and improving reliability thereof.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A paste for a solid oxide fuel cell, wherein said past comprises:
    (a) raw material powder of an anode functional layer, an electrolyte layer, a cathode functional layer, a cathode layer or a current collecting layer;
    (b) ethyl cellulose as a binder;
    (c) alpha terpineol as a solvent;
    (d) an alcoholic solvent having solubility for a thermosetting binder and being present in an amount from 0.5 to 20 wt % of the alpha terpineol; and
    (e) a phenolic thermosetting binder in an amount from 5 to 40 wt % of the ethyl cellulose.

2. The paste for the solid oxide fuel cell as claimed in claim 1, which comprises 53 to 63 wt % of the raw material powder, 1.0 to 5.4 wt % of the ethyl cellulose, and 30 to 40 wt % of the alpha terpineol, and wherein the paste is formulated to produce the anode functional layer.

3. The paste for the solid oxide fuel cell as claimed in claim 1, which comprises 40 to 60 wt % of the raw material powder, 0.7 to 9.3 wt % of the ethyl cellulose, and 32 to 40 wt % of the alpha terpineol, and wherein the paste is formulated to produce the electrolyte layer.

4. The paste for the solid oxide fuel cell as claimed in claim 1, which comprises 48 to 60 wt % of the raw material powder, 3.0 to 3.5 wt % of the ethyl cellulose, and 32 to 50 wt % of the alpha terpineol, and wherein the paste is formulated to produce the cathode functional layer.

5. The paste for the solid oxide fuel cell as claimed in claim 1, which comprises 45 to 55 wt % of the raw material powder, 1.1 to 2.5 wt % of the ethyl cellulose, and 32 to 50 wt % of the alpha terpineol, and wherein the paste is formulated to produce the cathode layer.

6. The paste for the solid oxide fuel cell as claimed in claim 1, which comprises 45 to 55 wt % of the raw material powder, 1.1 to 4.9 wt % of the ethyl cellulose, and 35 to 48 wt % of the alpha terpineol, and wherein the paste is formulated to produce the current collecting layer.

7. A fabricating method of an anode-supported solid oxide fuel cell, comprising the steps of:
    forming a planar type anode support with granules containing raw material powder and a thermosetting binder;

forming an anode functional layer and an electrolyte layer on the anode support by screen printing by using the paste comprising raw material powder of an anode functional layer according to claim 1, followed by forming an electrolyte layer on the anode functional layer by screen printing the paste comprising raw material powder of an electrolyte layer according to claim 1;

co-firing the structure of the anode support/anode functional layer/electrolyte layer; and forming a cathode layer on the electrolyte layer by screen printing the paste comprising raw material powder of a cathode layer according to claim 1.

8. The fabricating method of the solid oxide fuel cell as claimed in claim 7, wherein the thermosetting binder contained in the anode support comprises at least one of thermosetting resin selected from phenolic resin, polyester and polyamide, and thermoplastic resin selected from polyvinyl butyral, polyvinyl alcohol, polyvinyl pyrrolidone and acrylic resin.

9. The fabricating method of the solid oxide fuel cell as claimed in claim 7, wherein the paste comprises raw material powder of each layer of the fuel cell, ethyl cellulose, alpha terpineol, and an alcoholic solvent added by 0.5 to 20 wt % of alpha terpineol.

10. The fabricating method of the solid oxide fuel cell as claimed in claim 7, wherein the paste further comprises a thermosetting binder by 5 to 40 wt % of ethyl cellulose.

11. The fabricating method of the solid oxide fuel cell as claimed in claim 10, wherein at least one of the layers formed by screen printing is dried and cured at 90 to 200° C. for 0.1 to 2 hours.

12. The fabricating method of the solid oxide fuel cell as claimed in claim 7, wherein, in the co-firing step, the thermal treatment is performed by maintaining a heating rate below 1° C. per minute in a temperature range of the binder removal, sharply increasing the heating rate to 2 to 5° C. per minute prior to the sintering of the electrolyte layer, and maintaining the heating rate below 2° C. per minute up to desired sintering temperature.

13. The fabricating method of the solid oxide fuel cell as claimed in claim 7, wherein the cathode layer comprises a cathode functional layer, a buffering cathode layer and a current collecting layer.

14. A planar type anode-supported solid oxide fuel cell fabricated by the method of claim 7, wherein 0.3 to 1 mm of porous anode support, to 50 μm of anode functional layer, 5 to 20 μm of electrolyte layer and 30 to 80 μm of cathode layer are sequentially formed.

* * * * *